US007104506B1

(12) United States Patent
Goodzeit et al.

(10) Patent No.: US 7,104,506 B1
(45) Date of Patent: Sep. 12, 2006

(54) SPACECRAFT DISTURBANCE TRIMMING SYSTEM

(75) Inventors: Neil E. Goodzeit, Princeton, NJ (US); Santosh Ratan, Highland Park, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/910,582

(22) Filed: Aug. 4, 2004

Related U.S. Application Data

(60) Provisional application No. 60/493,220, filed on Aug. 6, 2003.

(51) Int. Cl.
*B64G 1/24* (2006.01)
(52) U.S. Cl. .................................. 244/168; 244/172.7
(58) Field of Classification Search ................ 244/168, 244/173, 172.7
See application file for complete search history.

(56) References Cited

U.S. PATENT DOCUMENTS

| | | | |
|---|---|---|---|
| RE29,177 E | | 4/1977 | Michaelis |
| 4,949,922 A | | 8/1990 | Rosen |
| 5,133,518 A | * | 7/1992 | Flament ..................... 244/173 |
| 5,310,144 A | | 5/1994 | Salvatore et al. |
| 5,687,933 A | | 11/1997 | Goodzeit et al. |
| 5,716,031 A | * | 2/1998 | Duchon ....................... 244/164 |
| 5,775,645 A | * | 7/1998 | Yocum et al. ............... 244/168 |
| 5,833,175 A | * | 11/1998 | Caplin ..................... 244/158 R |
| 5,906,339 A | | 5/1999 | Basuthakur et al. |
| 6,010,096 A | * | 1/2000 | Baghdasarian .............. 244/173 |
| 6,070,833 A | | 6/2000 | Burke et al. |
| 6,076,772 A | | 6/2000 | Eyerly et al. |
| 6,076,773 A | | 6/2000 | Salvatore |
| 6,102,336 A | * | 8/2000 | Cande ......................... 244/168 |
| 6,311,929 B1 | | 11/2001 | Kazimi et al. |
| 6,445,981 B1 | | 9/2002 | Higham et al. |
| 6,600,976 B1 | | 7/2003 | Goodzeit et al. |

FOREIGN PATENT DOCUMENTS

| | | | | |
|---|---|---|---|---|
| JP | 0186498 | * | 7/1989 | ................. 244/168 |
| WO | WO90/06259 | * | 6/1990 | ................. 244/168 |

* cited by examiner

*Primary Examiner*—Galen Barefoot
(74) *Attorney, Agent, or Firm*—McDermott Will & Emery LLP

(57) ABSTRACT

A spacecraft comprises a main body; at least one elongated solar wing extending from the main body, defining a generally flat plane and comprising a pair of longitudinally extending side edges; at least one other component or structure extending from the main body and spaced at a separation distance from the at least one solar wing; and at least one solar trim tab coupled to the at least one solar wing, linearly elongated and extending in the generally flat plane in a direction transversely away from one of the longitudinally extending side edges, and sized and positioned along the longitudinally extending side edge for counteracting or compensating for one or more types of disturbance torques.

22 Claims, 2 Drawing Sheets

SPACECRAFT DISTURBANCE TRIMMING SYSTEM

CROSS-REFERENCE TO PROVISIONAL APPLICATION

This application claims priority from U.S. provisional patent application Ser. No. 60/493,220 filed Aug. 6, 2003, the entire disclosure of which is incorporated herein by reference.

FIELD OF THE DISCLOSURE

The disclosure relates generally to spacecraft. In particular, the disclosure relates to methods and systems for compensating for pitch gravity-gradient torque and other environmental torques to which certain types of spacecraft are subject.

BACKGROUND DISCUSSION

In certain types of spacecraft, such as geosynchronous orbiting (GEO) spacecraft that comprise large deployed reflectors and/or antennas, pitch gravity-gradient torques may result from the geometric arrangement of the various components of the spacecraft. For example, in the case of a mobile user objective system (MUOS), a spacecraft may comprise a solar cell array and a deployed mesh reflector or antenna, with a separation between the solar cell array and mesh reflector/antenna being on the order of 50 feet. This separation between spacecraft components results in a difference in gravitational force with the orbited body (spacecraft) in accordance with the well-known inverse-square gravitational law, and produces a resultant pitch gravity-gradient disturbance torque. In addition, spacecraft may be subject to a number of other types of environmental disturbance torques.

Referring to FIG. 1, schematically shown therein is an illustrative, but not limitative, example of an asymmetrically arranged spacecraft 100 of the type contemplated above, comprising a main body 101 including power supply systems, sensors, thrusters, fuel storage means, etc. A plurality of deployed solar cell arrays ("wings"), illustratively a pair of wings 105-1, 105-2, extend in opposite directions from opposite sides or surfaces of main body 101. Similarly, differently sized, deployed reflectors/antennas 110, 111 extend in opposite directions from main body 101.

Typically, disturbance torques experienced by spacecraft 100 cause the spacecraft stored momentum to increase, which momentum is conventionally stored (i.e., absorbed) in a system comprising at least one spinning flywheel, variously referred to as a "reaction wheel" or "momentum wheel", by changing the angular velocity of the at least one flywheel. Periodically, when the momentum storage capacity of the system is reached, momentum must be removed ("dumped") by generating opposing momentum components, e.g., by firing thrusters of the spacecraft's reaction-control system. However, significant disadvantages associated with such approach for momentum control include the increased consumption of propellant, increased ground operator workload, and the need for accommodating the disturbance torques may affect the design of the spacecraft thruster configuration and redundancy.

By way of illustration, for MUOS the pitch gravity gradient with a single large (14 meter) reflector/antenna is ~2,000 μin.-lb., which results in a pitch momentum accumulation of 172 in.-lb.-sec./day and the need for daily momentum adjust maneuvers.

In view of the foregoing, there exists a clear need for improved means and methodology for mitigating the above-described problems, drawbacks, and disadvantages associated with the conventional approaches for providing compensation of pitch gravity-gradient disturbance torque and other environmental torques experienced by spacecraft of the type contemplated herein.

SUMMARY OF THE DISCLOSURE

An advantage of the present disclosure is an improved spacecraft.

Another advantage of the present disclosure is an improved solar array adapted for use with spacecraft.

Yet another advantage of the present disclosure is an improved method of operating a spacecraft in orbit around a body.

Additional advantages and other features of the present disclosure will be set forth in the description which follows and in part will become apparent to those having ordinary skill in the art upon examination of the following or may be learned from the practice of the present disclosure. The advantages of the present disclosure may be realized and obtained as particularly pointed out in the appended claims.

According to an aspect of the present disclosure, the foregoing and other advantages are obtained in part by a spacecraft comprising:

(a) a main body;
(b) at least one elongated solar wing extending from the main body, defining a generally flat plane and comprising a pair of longitudinally extending side edges;
(c) at least one other component or structure extending from the main body and spaced at a separation distance from the at least one solar wing; and
(d) at least one solar trim tab coupled to the at least one solar wing, the at least one solar trim tab being linearly elongated and extending in the generally flat plane in a direction transversely away from one of the longitudinally extending side edges, the at least one solar trim tab sized and positioned along the one longitudinally extending side edge for counteracting or compensating for one or more types of disturbance torques.

According to preferred embodiments of the disclosure, the at least one solar wing includes a plurality of photovoltaic solar cells arranged in the generally flat plane; the at least one solar wing comprises a pair of oppositely extending, linearly elongated solar wings, each of the pair of wings including at least one linearly elongated solar trim tab extending in the generally flat plane in a direction transversely away from one of the longitudinally extending side edges; the at least one solar wing comprises a plurality of rollable, collapsible, or foldable array of solar cell panels and includes a mechanism for deploying the elongated solar wing subsequent to launch of the spacecraft; the at least one solar wing comprises a release mechanism for deploying the at least one solar trim tab subsequent to launch of the spacecraft; the release mechanism further includes a mechanism for controllably transversely extending the solar trim tab for a predetermined distance from the one longitudinally extending side edge; the at least one other component or structure comprises a reflector or antenna, preferably a pair of reflectors or antennas spaced apart at a separation distance; the at least one solar trim tab comprises a polyimide material; and the spacecraft is a GEO spacecraft including a MUOS system.

Another aspect of the present disclosure is a solar array adapted for use with a spacecraft, comprising:
(a) an elongated solar wing defining a generally flat plane and comprising a pair of longitudinally extending side edges; and
(b) at least one solar trim tab coupled to the solar wing, the at least one solar trim tab being linearly elongated and extending in the generally flat plane in a direction transversely away from one of the longitudinally extending side edges, the at least one solar trim tab sized and positioned along the one longitudinally extending side edge for counteracting or compensating for one or more types of disturbance torques.

According to preferred embodiments of the present disclosure, the solar wing includes a plurality of photovoltaic solar cells arranged in the generally flat plane; the solar wing comprises a plurality of rollable, collapsible, or foldable array of solar cell panels and includes a mechanism for deploying the elongated solar wing subsequent to launch of the spacecraft; the solar wing comprises a release mechanism for deploying the at least one solar trim tab subsequent to launch of the spacecraft; and the release mechanism further includes a mechanism for controllably transversely extending the solar trim tab for a predetermined distance from the one longitudinally extending side edge.

Yet another aspect of the present disclosure is a method for operating a spacecraft in orbit around a body, comprising steps of:
(a) providing a spacecraft in orbit around the body, the spacecraft including:
    (i) a main body;
    (ii) at least one elongated solar wing extending from the main body, comprising a plurality of photovoltaic solar cells defining a generally flat plane and including a pair of longitudinally extending side edges;
    (iii) at least one other component or structure extending from the main body and spaced at a separation distance from the at least one solar wing; and
    (iv) at least one solar trim tab coupled to the at least one solar wing, the at least one solar trim tab being linearly elongated and extending in the generally flat plane in a direction transversely away from one of the longitudinally extending side edges; and
(b) utilizing the at least one solar trim tab for counteracting or compensating for one more types of disturbance torques.

According to preferred embodiments of the present disclosure, step (a) comprises providing a spacecraft, e.g., a GEO spacecraft included in a MUOS system, comprising: (1) a pair of oppositely extending, linearly elongated solar wings, each of the pair of wings including at least one linearly elongated solar trim tab extending in the generally flat plane in a direction transversely away from one of the longitudinally extending side edges; (2) a mechanism for controllably transversely extending the solar trim tab for a predetermined distance from the one longitudinally extending side edge; and (3) the at least one other component or structure comprises a reflector or antenna; and step (b) comprises utilizing the at least one solar trim tab for counteracting or compensating for at least one of: (1) a gravity-gradient disturbance torque resulting from the separation distance between the at least one solar wing and the at least one other component or structure when the spacecraft is in orbit about a body; (2) a yaw/roll disturbance torque; (3) an RF transmission pitch torque; and (4) other environmental disturbance torques.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the various features are not necessarily drawn to scale but rather are drawn as to best illustrate the pertinent features and the same reference numerals are employed throughout for designating similar features, wherein.

DETAILED DESCRIPTION

The present disclosure addresses and effectively solves, or at least mitigates, the above-described problems and difficulties associated with the deleterious pitch gravity gradient torque and other environmental torques to which certain spacecraft (e.g., GEO satellites) with particular geometrical arrangements of components are subject, and is based upon recognition by the inventors of the benefits obtained and realized by providing at least one solar wing of the spacecraft with at least one linearly elongated solar trim tab extending from a longitudinally extending side edge of the wing within the plane of the generally planar solar wing.

According to the disclosure, the at least solar trim tab is sized and positioned along the one longitudinally extending side edge for counteracting or compensating for one or more types of disturbance torques. Such disturbance torques include, but are not limited to: (1) a gravity-gradient disturbance torque resulting from the separation distance between the at least one solar wing and the at least one other component or structure when the spacecraft is in orbit about a body; (2) a yaw/roll disturbance torque; (3) an RF transmission pitch torque; and (4) other environmental disturbance torques.

Additional features of the disclosure include the following:
the at least one solar wing includes a plurality of photovoltaic solar cells arranged in the generally flat plane;
the at least one solar wing comprises a pair of oppositely extending, linearly elongated solar wings, each of the pair of wings including at least one linearly elongated solar trim tab extending in the generally flat plane in a direction transversely away from one of the longitudinally extending side edges;
the at least one solar wing comprises a plurality of rollable, collapsible, or foldable array of solar cell panels and includes a mechanism for deploying the elongated solar wing subsequent to launch of the spacecraft;

the at least one solar wing comprises a release mechanism for deploying the at least one solar trim tab subsequent to launch of the spacecraft;

the release mechanism further includes a mechanism for controllably transversely extending the solar trim tab for a predetermined distance from the one longitudinally extending side edge;

the at least one other component or structure comprises a reflector or antenna, preferably a pair of reflectors or antennas spaced apart at a separation distance, as in a GEO satellite included in a MUOS system; and the at least one solar trim tab comprises a polyimide material.

Figure 1:
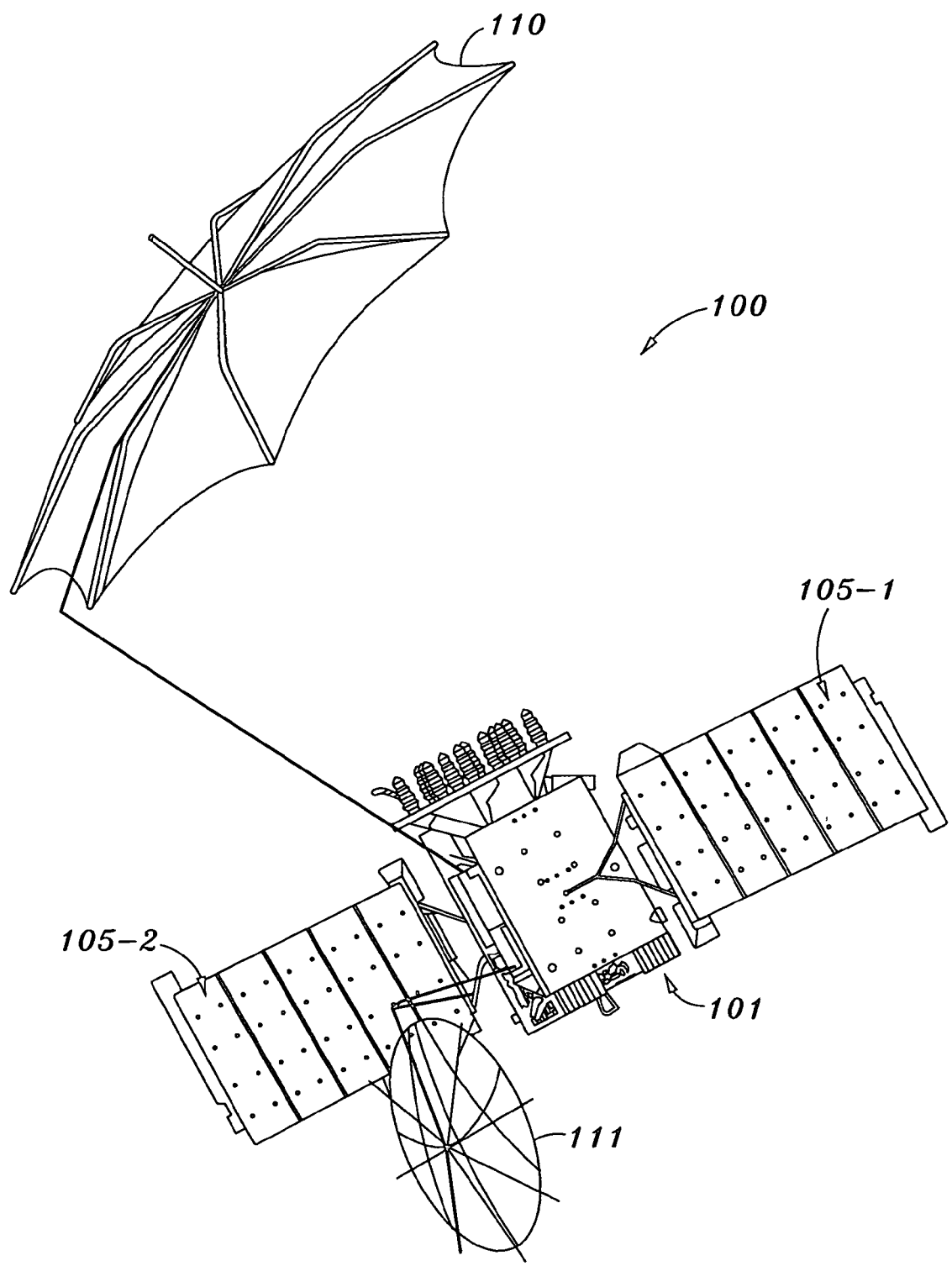
FIG. 1 is a simplified perspective view of a conventional GEO spacecraft comprising a pair of solar wings and a pair of reflectors/antennas.
Figure 2:
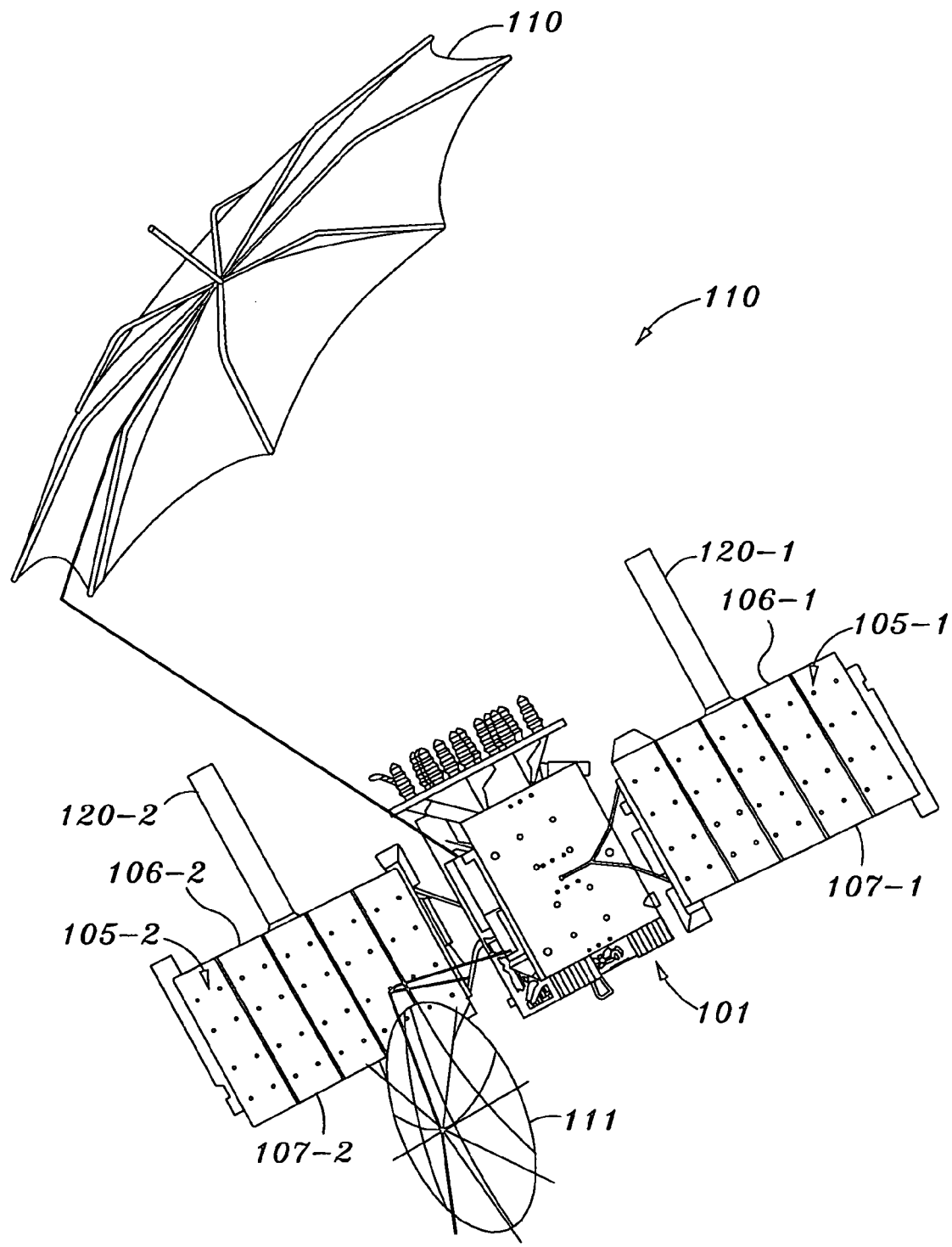
FIG. 2 is a simplified perspective view of a GEO spacecraft according to an illustrative, but not limitative, embodiment of the present disclosure.

Referring to FIG. 2, shown therein is a simplified perspective view of a GEO spacecraft 110 according to an illustrative, but not limitative, embodiment of the present disclosure. As illustrated, spacecraft 110 is structurally similar to the conventional spacecraft 100 shown in FIG. 1 but differs therefrom in essential respect by the addition of linearly elongated solar trim tabs 120-1, 120-2 to respective, generally flat planar solar wings 105-1, 105-2. Solar trim tabs 120-1, 120-2 extend transversely to first longitudinally extending side edges 106-1, 106-2 and within the generally flat planes defined by solar wings 105-1, 105-2.

Each of the deployed, generally flat planar solar wings 105-1, 105-2 comprises a plurality of photovoltaic solar cells of suitable type for a particular space-based application, and is further comprised of a plurality of rollable, collapsible, or foldable array of panels each mounting the solar cells, which array is maintained in a stored condition prior to and during launch and include a suitable (i.e., conventional) mechanism for deployment (not shown in the drawings for illustrative simplicity) to form the elongated solar wings subsequent to launch.

According to preferred embodiments the disclosure, each of the solar trim tabs 120-1, 120-2 may be comprised of a polyimide material such as KAPTON™ (available from the DuPont Co.) and produce a lateral offset of the solar wing center of pressure and a resultant constant solar pressure pitch torque. Solar trim tabs 120-1, 120-2 are sized and arranged along the respective side edges 106-1, 106-2 of solar wings 105-1, 105-2 to counteract the gravity-gradient disturbance torque, as well as any other pitch torques which may be present, e.g., a yaw/roll disturbance torque and an RF transmission pitch torque. Each of the solar wings 105-1, 105-2 is further provided with a suitable release mechanism (not shown in the figure for illustrative simplicity) for deploying solar tabs 120-1, 120-2 subsequent to launch of spacecraft 110 into orbit. The release mechanism may further provide for controllable extension of the solar trim tabs for a predetermined distance or length from the longitudinally extending side edges of the solar wings. Moreover, whereas only one solar trim tab 120-1, 120-2 (as opposed to a plurality of solar trim tabs) is shown as extending from a respective first side edge 106-1, 106-2 of solar wings 105-1, 105-2 in the illustrative embodiment shown in FIG. 2 (as opposed to respective second longitudinally extending side edges 107-1, 107-2), the disclosure is not limited to the illustrated arrangement. Specifically, the number and arrangement of solar trim tabs provided for each solar wing is variable according to the particular geometric arrangement of the spacecraft.

By way of example only, in one specific embodiment according to the design arrangement shown in FIG. 2, wherein spacecraft 110 comprises a pair of solar wings 105-1, 105-2, the total mass of the two solar trim tabs 120-1, 120-2 (with release mechanisms) is approximately 3 Kg. When applied to a GEO satellite included in a MUOS system, such arrangement results in a thruster fuel savings of ~70 Kg. If the solar trim tabs are oriented/positioned as to additionally provide compensation for a portion of the yaw/roll disturbance torque, additional fuel savings may result.

While the above disclosure has focused primarily on applications to spacecraft with a single large deployed reflector/antenna, such as MUOS, the principles described herein may also be used to provide a fuel savings for other types of spacecraft, such as standard GEO spacecraft.

In the previous description, numerous specific details are set forth, such as specific materials, structures, processes, etc., in order to provide a better understanding of the present disclosure. However, the present disclosure can be practiced without resorting to the details specifically set forth. In other instances, well-known processing techniques and structures have not been described in order not to unnecessarily obscure the present disclosure.

Only the preferred embodiments and but a few examples of the versatility of the present disclosure are shown and described herein. It is to be understood that the present disclosure is capable of use in various other combinations and environments and is susceptible of changes and/or modifications within the scope of the inventive concept as expressed herein.

What is claimed is:

1. A spacecraft comprising:
   (a) a main body;
   (b) at least one elongated solar wing extending from said main body, defining a generally flat plane and comprising a pair of longitudinally extending side edges;
   (c) at least one other component or structure extending from said main body and spaced at a separation distance from said at least one solar wing; and
   (d) at least two solar trim tabs coupled to said at least one solar wing, said at least two solar trim tabs being linearly elongated and extending in said generally flat plane in a same direction that is transversely away from, and perpendicular to, one of said longitudinally extending side edges, said at least two solar trim tabs tab being sized and positioned along said one longitudinally extending side edge for counteracting or compensating for one or more types of disturbance pitch torques.

2. The spacecraft as in claim 1, wherein:
said at least one solar wing includes a plurality of photovoltaic solar cells arranged in said generally flat plane.

3. The spacecraft as in claim 1, wherein:
said at least one solar wing comprises a pair of oppositely extending, linearly elongated solar wings, each said oppositely extending solar wing including at least one of said linearly elongated solar trim tabs positioned at a substantially similar distance along an extending linear axis of each said oppositely extending solar wing.

4. The spacecraft as in claim 1, wherein:
said at least one solar wing comprises a plurality of rollable, collapsible, or foldable array of solar cell panels and includes a mechanism for deploying said elongated solar wing subsequent to launch of said spacecraft.

5. The spacecraft as in claim 4, wherein:
said at least one solar wing comprises a release mechanism for deploying said at least two solar trim tabs subsequent to launch of said spacecraft.

6. The spacecraft as in claim 5, wherein:
said release mechanism further includes a mechanism for controllably transversely extending each said solar trim tab for a predetermined distance from said one longitudinally extending side edge.

7. The spacecraft as in claim 1, wherein:
said at least one other component or structure comprises a reflector or antenna.

8. The spacecraft as in claim 7, wherein:
said at least one other component or structure comprises a pair of reflectors or antennas spaced apart at a separation distance.

9. The spacecraft as in claim 1, wherein:
each of said at least two solar trim tabs comprises a polyimide material.

10. The spacecraft as in claim 1, wherein:
said spacecraft is a GEO spacecraft included in a MUOS system.

11. The spacecraft as in claim 3, wherein:
each said oppositely extending solar wing includes a plurality of said linearly elongated solar trim tabs disposed at substantially similar positions along the extending linear axis of each said oppositely extending solar wing, said plurality of solar trim tabs disposed on each said oppositely extending solar wing collectively acting to counteract one or more types of disturbance pitch torques.

12. A solar array adapted for use with a spacecraft, comprising:
(a) an elongated solar wing defining a generally flat plane and comprising a pair of longitudinally extending side edges; and
(b) at least two solar trim tabs coupled to said solar wing, said at least two solar trim tabs being linearly elongated and extending in said generally flat plane in a same direction that is transversely away from, and perpendicular to, one of said longitudinally extending side edges, said at least two solar trim tabs sized and positioned along said one longitudinally extending side edge for counteracting or compensating for one or more types of distance pitch torques.

13. The solar array as in claim 12, wherein:
said solar wing includes a plurality of photovoltaic solar cells arranged in said generally flat plane.

14. The solar array as in claim 13, wherein:
said solar wing comprises a plurality of rollable, collapsible, or foldable array of solar cell panels and includes a mechanism for deploying said elongated solar wing subsequent to launch of said spacecraft.

15. The solar array as in claim 14, wherein:
said solar wing comprises a release mechanism for deploying said at least two solar trim tabs subsequent to launch of said spacecraft.

16. The solar array as in claim 15, wherein:
said release mechanism further includes a mechanism for controllably transversely extending each said solar trim tab for a predetermined distance from said one longitudinally extending side edge.

17. A method for operating a spacecraft in orbit around a body, comprising steps of:
(a) providing a spacecraft in orbit around said body, said spacecraft including:
(i) a main body;
(ii) at least one elongated solar wing extending from said main body, comprising a plurality of photovoltaic solar cells defining a generally flat plane and including a pair of longitudinally extending side edges;
(iii) at least one other component or structure extending from said main body and spaced at a separation distance from said at least one solar wing; and
(iv) at least two solar trim tabs coupled to said at least one solar wing, said at least two solar trim tabs being linearly elongated and extending in said generally flat plane in a same direction that is transversely away from, perpendicular to one of said longitudinally extending side edges; and
(b) utilizing said at least two solar trim tabs for counteracting or compensating for one or more types of disturbance pitch torques.

18. The method according to claim 17, wherein:
step (a) comprises providing a spacecraft including a pair of oppositely extending, linearly elongated solar wings, each said oppositely extending solar wing including at least one of said linearly elongated solar trim tabs positioned at a substantially similar distance along an extending linear axis of each said oppositely extending solar wing.

19. The method according to claim 17, wherein:
step (a) comprises providing a spacecraft including a mechanism for controllably transversely extending each said solar trim tab for a predetermined distance from said one longitudinally extending side edge.

20. The method according to claim 17, wherein:
step (a) comprises providing a spacecraft wherein said at least one other component or structure comprises a reflector or antenna.

21. The method according to claim 20, wherein:
step (a) comprises providing a GEO spacecraft including a MUOS system; and
step (b) comprises utilizing said at least two solar trim tabs for counteracting or compensating for at least one of: (1) a gravity-gradient disturbance torque resulting from the separation distance between the at least one solar wing and the at least one other component or structure when the spacecraft is in orbit about a body; (2) a yaw/roll disturbance torque; (3) an RF transmission pitch torque; and (4) other environmental disturbance torques.

22. A spacecraft comprising:
(a) a main body;
(b) at least one elongated solar wing extending from said main body, defining a generally flat plane and comprising a pair of longitudinally extending side edges;
(c) at least one other component or structure extending from said main body and spaced at a separation distance from said at least one solar wing; and
(d) at least one solar trim tab coupled to said at least one solar wing, said at least one solar trim tab being linearly elongated and extending in said generally flat plane in a direction transversely away from one of said longitudinally extending side edges, said at least one solar trim tab sized and positioned along said one longitudinally extending side edge for counteracting or compensating for one or more types of disturbance pitch torques.

* * * * *

UNITED STATES PATENT AND TRADEMARK OFFICE
CERTIFICATE OF CORRECTION

PATENT NO. : 7,104,506 B1 Page 1 of 1
APPLICATION NO. : 10/910582
DATED : September 12, 2006
INVENTOR(S) : Neil E. Goodzeit et al.

It is certified that error appears in the above-identified patent and that said Letters Patent is hereby corrected as shown below:

IN THE SPECIFICATION:

Column 6, line 42; Remove "tab" before "being".

Column 8, line 11; Add --and-- before "perpendicular".

Column 8, line 11; Add --,-- after "to".

Signed and Sealed this

Thirty-first Day of July, 2007

JON W. DUDAS
*Director of the United States Patent and Trademark Office*